(12) United States Patent
Seed et al.

(10) Patent No.: US 10,171,286 B2
(45) Date of Patent: Jan. 1, 2019

(54) METHOD AND APPARATUS FOR ACCESSING SERVICES AFFILIATED WITH A DISCOVERED SERVICE PROVIDER

(75) Inventors: Dale N. Seed, Allentown, PA (US); Guang Lu, Montreal (CA); Chonggang Wang, Princeton, NJ (US); Rocco DiGirolamo, Laval (CA); Paul L. Russell, Jr., Pennington, NJ (US); Michael F. Starsinic, Newtown, PA (US); Ana Lucia Pinheiro, Hillsboro, OR (US); Nicholas J. Podias, Brooklyn, NY (US)

(73) Assignee: IOT HOLDINGS, INC., Wilmington, DE (US)

( * ) Notice: Subject to any disclaimer, the term of this patent is extended or adjusted under 35 U.S.C. 154(b) by 414 days.

(21) Appl. No.: 14/002,498

(22) PCT Filed: Feb. 24, 2012

(86) PCT No.: PCT/US2012/026537
§ 371 (c)(1),
(2), (4) Date: Dec. 10, 2013

(87) PCT Pub. No.: WO2012/118711
PCT Pub. Date: Sep. 7, 2012

(65) Prior Publication Data
US 2014/0089478 A1 Mar. 27, 2014

Related U.S. Application Data

(60) Provisional application No. 61/448,924, filed on Mar. 3, 2011, provisional application No. 61/485,711, filed on May 13, 2011.

(51) Int. Cl.
H04L 12/24 (2006.01)
H04W 4/70 (2018.01)
(Continued)

(52) U.S. Cl.
CPC ......... *H04L 41/0273* (2013.01); *H04W 4/001* (2013.01); *H04W 4/005* (2013.01);
(Continued)

(58) Field of Classification Search
CPC ....... H04W 4/70; H04W 4/001; H04W 4/005; H04W 4/50; H04L 61/1511
See application file for complete search history.

(56) References Cited

U.S. PATENT DOCUMENTS 6,766,361 B1 * 7/2004 Venigalla ............... G06Q 30/06
705/80
8,223,716 B2 7/2012 Ohba et al.
(Continued)

FOREIGN PATENT DOCUMENTS

CA 2645962 A1 6/2009
WO 09/092115 7/2009

OTHER PUBLICATIONS

Girodano, Maurizio. "DNS-Based Discovery System in Service Oriented Programming." P.M.A. Sloot et al. (Eds.): EGC 2005, LNCS 3470, pp. 840-850, 2005 (Year: 2005).*
(Continued)

*Primary Examiner* — Philip J Chea
*Assistant Examiner* — Ruth Solomon
(74) *Attorney, Agent, or Firm* — Volpe and Koenig, P.C.

(57) ABSTRACT

A method and apparatus are described for accessing services affiliated with a service provider. A first discovery procedure may be performed to discover at least one service provider, and a bootstrap procedure may be performed with the at least one discovered service provider. A second discovery procedure may then be performed to determine available service capability layers (SCLs) supported by the at least one discovered service provider. The first discovery procedure may include transmitting a service provider discovery
(Continued)

request including information for querying a record database to determine matching service provider discovery records, and receiving a service provider discovery response including a service discovery function record list that matches queries in the service provider discovery request. At least one service provider from the service discovery function record list may be selected to bootstrap with. Various versions of the second discovery procedure are described.

15 Claims, 12 Drawing Sheets

(51) Int. Cl.
  *H04W 4/50* (2018.01)
  *H04W 4/00* (2018.01)
  *H04L 29/12* (2006.01)

(52) U.S. Cl.
  CPC .............. *H04W 4/50* (2018.02); *H04W 4/70* (2018.02); *H04L 61/1511* (2013.01)

(56) References Cited

U.S. PATENT DOCUMENTS

| | | | |
|---|---|---|---|
| 8,243,623 B2 | 8/2012 | Gong et al. | |
| 8,650,619 B2* | 2/2014 | Sundaram | H04L 63/0869 713/168 |
| 9,071,925 B2* | 6/2015 | Viswanathan | H04W 4/005 |
| 2004/0267590 A1* | 12/2004 | Clark | G06F 21/121 705/26.35 |
| 2011/0140846 A1* | 6/2011 | Blanz | H04W 4/70 340/7.1 |
| 2011/0154392 A1 | 6/2011 | Huh et al. | |
| 2011/0255459 A1* | 10/2011 | Gupta | H04W 76/12 370/312 |
| 2012/0016942 A1* | 1/2012 | Cherian | H04W 4/70 709/206 |
| 2012/0047558 A1* | 2/2012 | Sundaram | H04L 63/0869 726/3 |
| 2012/0170451 A1* | 7/2012 | Viswanathan | H04W 4/005 370/230 |
| 2013/0336222 A1* | 12/2013 | Lu | H04W 72/00 370/328 |

OTHER PUBLICATIONS

Cheshire et al., "DNS-Based Service Discovery," Internet Engineering Task Force, Internet-Draft, draft-cheshire-dnsext-dns-sd-09.txt (Feb. 14, 2011).
Interdigital Communications, "M2M SCL Discovery Procedures," European Telecommunications Standards Institute, ETSI/M2M(11)0109, M2M#14bis Meeting (Mar. 28-Apr. 1, 2011).
Cheshire et al., "DNS-Based Service Discovery," Internet Engineering Task Force, Internet-Draft, draft-cheshire-dnsext-dns-sd-10.txt (Feb. 27, 2011).
Alcatel Lucent, "Automated Root Key Bootstrapping," European Telecommunications Standards Institute, ETSI/M2M(11)0024, M2M#14 Meeting (Jan. 17-21, 2011).
European Telecommunications Standards Institute, "Machine-to-Machine communications (M2M); Functional architecture," Draft ETS TS 102 690 V0.10.4 (Jan. 2011).
European Telecommunications Standards Institute, "Machine-to-Machine communications (M2M); Functional architecture," Draft ETS TS 102 690 V0.10.1 (Jan. 2011).
European Telecommunications Standards Institute, "Machine-to-Machine communications (M2M); Functional architecture," ETSI TS 102 690 V1.1.1 (Oct. 2011).
Interdigital Communications, "M2M SCL Discovery Procedures," European Telecommunications Standards Institute, ETSI/M2M(11)0185, M2M#14bis Meeting (Mar. 28-Apr. 1, 2011).

* cited by examiner

| SERVICE SUB-TYPE NAME | DESCRIPTION |
| --- | --- |
| DEFINED SERVICE CAPABILITIES SUPPORTED BY SCL | |
| hdr | SCL supports history and data retention sevices |
| cb | SCL supports compensation and brokerage services |
| sec | SCL supports security services |
| ip | SCL supports inter-networking proxy services |
| toe | SCL supports telco operator exposure services |
| tm | SCL supports transaction management services |
| rem | SCL supports remote entity management services |
| ae | SCL supports application enablement services |
| gc | SCL supports generic communication services |
| rar | SCL supports reachability, addressing and repository service |
| cs | SCL supports communication selection services |
| ADDITIONAL CAPABILITIES SUPPORTED BY SCL | |
| loc | SCL supports location services |
| mob | SCL supports mobility services |
| delay | SCL supports scheduling delay services |
| rates | SCL supports data rate services |
| per | SCL supports persistance services |
| priority | SCL supports priority level services |
| PROTOCOLS SUPPORTED BY SCL | |
| sclhttp | SCL supports HTTP protocol |
| sclcoap | SCL supports CoAP protocol |
| ibake | SCL supports IBAKE bootstrapping |
| oma | SCL supports OMA-DM protocol |
| PROFILES SUPPORTED BY SCL | |
| bldg | SCL supports building automation specific services |
| ehealth | SCL supports E-health specific services |
| elec | SCL supports consumer electronic specific services |
| util | SCL supports utilities specific services |

FIG. 7

METHOD AND APPARATUS FOR ACCESSING SERVICES AFFILIATED WITH A DISCOVERED SERVICE PROVIDER

CROSS REFERENCE TO RELATED APPLICATIONS

This application is a 371 National Phase of International Patent Application No. PCT/US2012/026537 filed Feb. 24, 2012, which claims the benefit of Provisional Application Ser. No. 61/448,924 filed Mar. 3, 2011, and Provisional Application Ser. No. 61/485,711 filed May 13, 2011, the contents of which are hereby incorporated by reference herein.

BACKGROUND

An end-to-end system architecture for supporting machine-to-machine (M2M) communication services is currently being defined by the European Telecommunications Standards Institute (ETSI) to enable M2M service providers to deliver M2M services to applications via M2M service capability layers (SCLs) deployed on wired or wireless M2M subscriber communication units (SCUs), gateways and servers. Before M2M services may be made available to applications, M2M SCUs and gateways may bootstrap and register to at least one M2M server to form an M2M network. In a typical deployment scenario, an M2M server may be owned or affiliated with an M2M service provider. Therefore, an M2M SCU or gateway may be provisioned with a subscription to an M2M service provider, or an M2M service provider may be discovered to establish a subscription to the M2M service provider. The M2M service provider subscriber may enable the M2M SCU or gateway to obtain the proper security credentials before bootstrapping and registering with an M2M server.

Once the M2M network has formed, applications may then discover available M2M SCLs residing on M2M SCUs, M2M gateways and M2M servers and, in turn, register to the M2M SCLs to access corresponding services. Without providing M2M service provider discovery, bootstrap and SCL discovery procedures, mechanisms such as offline provisioning may be used to configure and distribute bootstrap and discovery information to M2M SCUs, gateways, applications and M2M servers. However, such mechanisms may greatly increase deployment and management costs, and limit the scalability of M2M networks. As an alternative to offline provisioning, automated discovery may allow available M2M service providers and their corresponding M2M SCLs to be dynamically discovered. As a result, management costs may be reduced and the deployment process may be automated, (e.g., for M2M SCUs which may have little or no human interaction).

SUMMARY

A method and apparatus are described for accessing services affiliated with a service provider. A first discovery procedure may be performed to discover at least one service provider, and a bootstrap procedure may be performed with the at least one discovered service provider. Then, a second discovery procedure may be performed to determine available service capability layers (SCLs) supported by the at least one service provider.

The first discovery procedure may include transmitting a service provider discovery request including information for querying a record database to determine matching service provider discovery records, and receiving a service provider discovery response including a service discovery function record list that matches queries in the service provider discovery request. At least one service provider from the service discovery function record list may be selected to bootstrap with.

The bootstrap procedure may include transmitting a request to the selected service provider, and receiving a response from the selected service provider including information needed by the node to initiate bootstrapping with at least one SCL of the service provider. The information may include security credentials.

The second discovery procedure may include an issuer, (e.g., an application or SCL residing on an M2M subscriber communication unit (SCU), M2M gateway or M2M server), transmitting a service discovery request including information for querying a record database to determine matching SCL discovery records, and the issuer receiving a service discovery response including a service discovery function record list that matches queries in the service discovery request. The issuer may select at least one SCL from the service discovery function record list to bootstrap with.

The second discovery procedure may include provisioning a domain name system-based service discovery (DNS-SD) machine-to-machine (M2M) service discovery function (MSDF) server with SCL discovery records, registering the DNS-SD MSDF server with a public DNS registrar company or entity to establish a public DNS-SD MSDF service discovery domain, the DNS-SD MSDF server receiving DNS-SD queries from an issuer, and the DNS-SD MSDF server transmitting SCL discovery records to the issuer in response to the DNS-SD queries.

The second discovery procedure may include receiving an SCL discovery request from an issuer, and transmitting a service discovery response which provides the issuer with SCL discovery results. The SCL discovery request may include query strings that use sclBase attributes. The SCL discovery response may include a list of SCLs that match the query strings and an absolute uniform resource identifier (URI) to an sclBase for each of the SCLs.

The second discovery procedure may include provisioning or configuring an issuer with a network address of a DNS server, provisioning or configuring the issuer with at least one fully qualified domain name (FQDN) for hosts with available SCLs, the issuer transmitting a DNS lookup request to the deployed DNS server using the network address and FQDN, and the issuer receiving a resolved network address for a corresponding SCL host.

The second discovery procedure may include provisioning or configuring an issuer with a network address of a dynamic host configuration protocol (DHCP) server, the issuer transmitting DHCP requests to the deployed DHCP server, and the issuer receiving a response including the address of an SCL and additional SCL information.

Services affiliated with a service provider may be accessed by provisioning or configuring an issuer with a network address of a deployed domain name system (DNS) server, provisioning or configuring the issuer with at least one fully qualified domain name (FQDN) for hosts with available SCLs, the issuer transmitting a DNS lookup request to the deployed DNS server using the network address and FQDN, and the issuer receiving a resolved network address for a corresponding SCL host. The issuer may be a wireless transmit/receive unit (WTRU).

An apparatus may be configured to perform a first discovery procedure to discover at least one service provider, perform a bootstrap procedure with the at least one discovered service provider, and then perform a second discovery procedure to determine available SCLs supported by the at least one discovered service provider. The apparatus may be a WTRU, a gateway or a server.

A computer-readable storage medium may be configured to store an application configured to perform a first discovery procedure to discover at least one service provider, perform a bootstrap procedure with the at least one discovered service provider, and then perform a second discovery procedure to determine available SCLs supported by the at least one discovered service provider.

BRIEF DESCRIPTION OF THE DRAWINGS

A more detailed understanding may be had from the following description, given by way of example in conjunction with the accompanying drawings wherein:

FIG. 7 shows examples of types of service sub-types that may be supported via MSDF DNS-based service discovery (DNS-SD) SCL discovery;

DETAILED DESCRIPTION

Figure 1A:
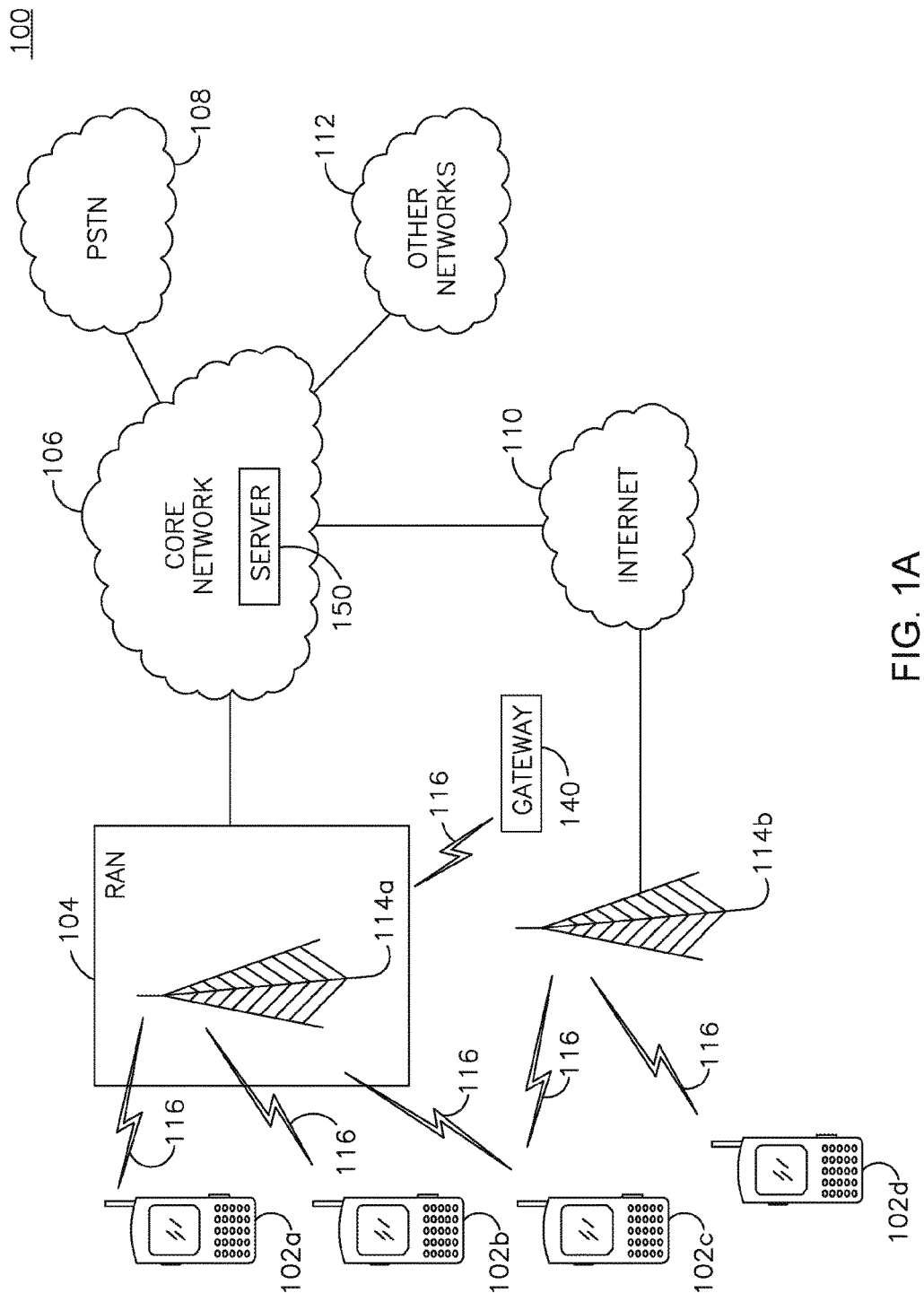
FIG. 1A shows an example communications system in which one or more disclosed embodiments may be implemented.

As shown in FIG. 1A, the communications system 100 may include wired or wireless subscriber communication units (SCUs) 102a, 102b, 102c, 102d, a radio access network (RAN) 104, a core network (CN) 106, a public switched telephone network (PSTN) 108, the Internet 110, other networks 112 and a gateway 140, though it will be appreciated that the described embodiments contemplate any number of subscriber communication units, base stations, networks, and/or network elements. The CN 106 may include a server 150. Each of the SCUs 102a, 102b, 102c, 102d may be any type of device configured to operate and/or communicate in a wired or wireless environment. By way of example, the SCUs 102a, 102b, 102c, 102d may be configured to transmit and/or receive wired or wireless signals and may include user equipment (UE), a mobile station, a fixed or mobile subscriber unit, a pager, a cellular telephone, a personal digital assistant (PDA), a smartphone, a laptop, a notebook, a personal computer, a tablet computer, a wireless sensor, consumer electronics, and the like.

The communications system 100 may also include a base station 114a and a base station 114b. Each of the base stations 114a, 114b may be any type of device configured to interface with at least one of the SCUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base station 114b in FIG. 1A may be a wireless router, HNB, HeNB, or AP, for example, and may utilize any suitable radio access technology (RAT) for facilitating wireless connectivity in a localized area, such as a place of business, a home, a vehicle, a campus, and the like. In one embodiment, the base station 114b and the SCUs 102c, 102d may implement a radio technology such as IEEE 802.11 to establish a wireless local area network (WLAN). In another embodiment, the base station 114b and the SCUs 102c, 102d may implement a radio technology such as IEEE 802.15 to establish a wireless personal area network (WPAN). In yet another embodiment, the base station 114b and the SCUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet protocol (VoIP) services to one or more of the SCUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the SCUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Figure 1B:
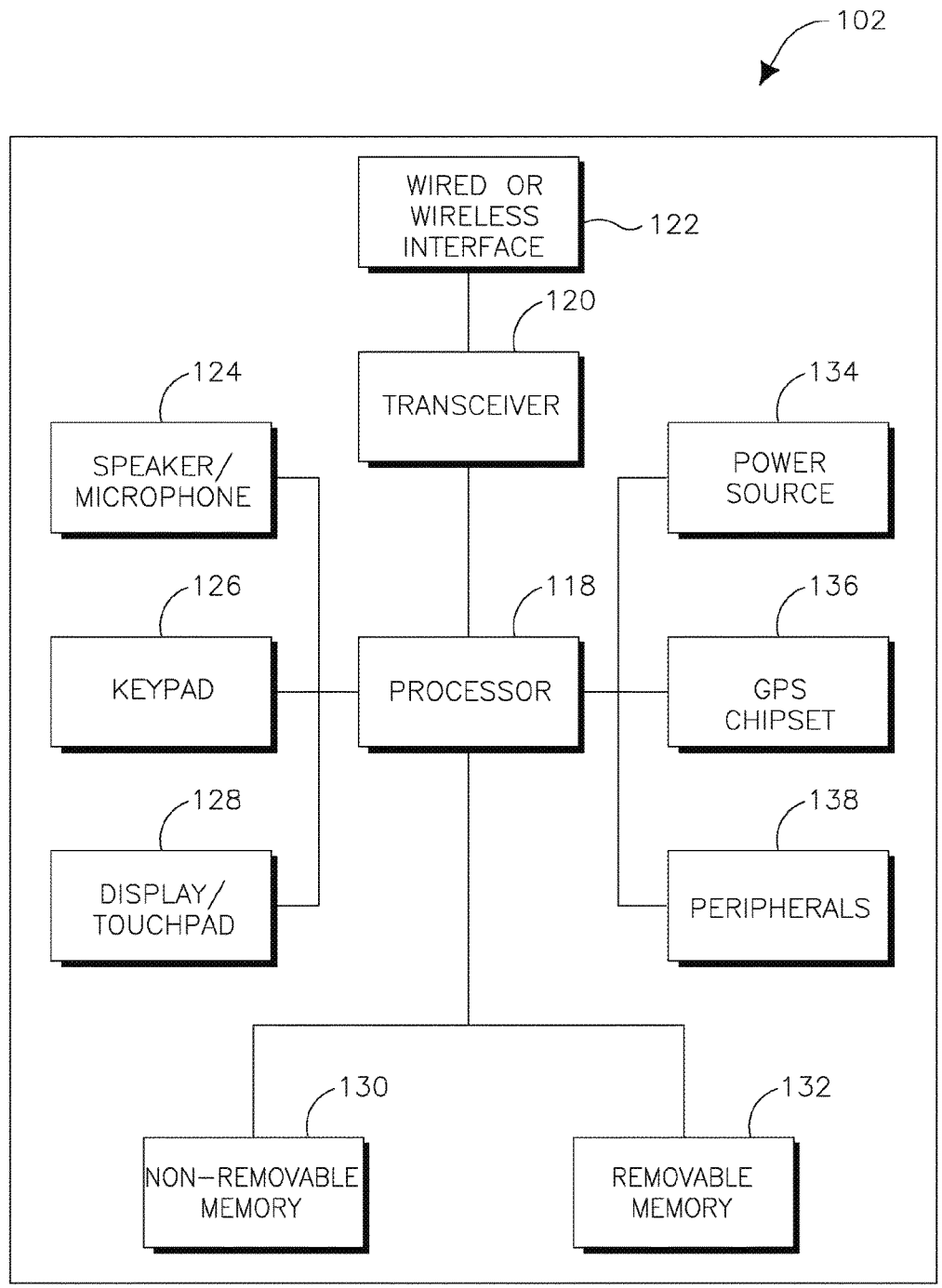
FIG. 1B shows an example subscriber communication unit (SCU) that may be used within the communications system shown in FIG. 1A.

Some or all of the SCUs 102a, 102b, 102c, 102d in the communications system 100 may include multi-mode capabilities, i.e., the SCUs 102a, 102b, 102c, 102d may include multiple transceivers for communicating with different wired or wireless networks over different wired or wireless links. For example, the SCU 102c shown in FIG. 1A may be configured to communicate with the base station 114a, which may employ a cellular-based radio technology, and with the base station 114b, which may employ an IEEE 802 radio technology. Alternatively, one or more of the SCUs 102 may be a laptop having a wired Ethernet connection plus a broadband wireless connection to provide multiple sub-flows, FIG. 1B shows an example SCU 102 that may be used within the communications system 100 shown in FIG. 1A. As shown in FIG. 1B, the SCU 102 may include a processor 118, a transceiver 120, a wired or wireless interface 122, a speaker/microphone 124, a keypad 126, a display/touchpad 128, a non-removable memory 130, a removable memory 132, a power source 134, a global positioning system (GPS) chipset 136, and peripherals 138. It will be appreciated that the SCU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the SCU 102 to operate in a wired or wireless environment. The processor 118 may be coupled to the transceiver 120, which may be coupled to the interface 122. While FIG. 1B depicts the processor 118 and the transceiver 120 as separate components, the processor 118 and the transceiver 120 may be integrated together in an electronic package or chip.

The interface 122 may be configured to transmit signals to, or receive signals from, a base station (e.g., the base station 114a) over an air interface 116. For example, in one embodiment, the interface 122 may be an antenna configured to transmit and/or receive RF signals. In another embodiment, the interface 122 may be an emitter/detector configured to transmit and/or receive IR, UV, or visible light signals, for example. In yet another embodiment, the interface 122 may be configured to transmit and receive both RF and light signals. The interface 122 may be configured to transmit and/or receive any combination of wired or wireless signals.

The processor 118 of the SCU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the SCU 102, such as on a server or a home computer (not shown).

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Hereinafter, the terminology "issuer" may refer to an application or SCL residing on an M2M subscriber communication unit (SCU), M2M gateway or M2M server.

The domain name system (DNS) is a hierarchical naming system built on a distributed database for computers, services or any resource connected to the Internet or a private network. The DNS may associate Internet protocol (IP) addresses with domain names assigned to each of the participating entities. Most importantly, it translates domain names into the numerical identifiers associated with networking equipment for the purpose of locating and addressing these devices worldwide.

DNS-based service discovery (DNS-SD) uses standard DNS programming interfaces, servers and packet formats to support discovery of network services. Using standard DNS queries, a client may discover a list of named instances of a desired service using standard DNS queries. This may be accomplished based on a type of service that a client is looking for and a domain in which the client is looking for that service.

The dynamic host configuration protocol (DHCP) automates network-parameter assignment to network devices from one or more DHCP servers. When a DHCP-configured client connects to a network, a DHCP client may request necessary information from a DHCP server.

Before an M2M SCU, M2M gateway or another M2M server may bootstrap and register with a particular M2M server, it is important for the M2M SCU or M2M gateway to establish a relationship with the M2M service provider affiliated with that M2M server to obtain the necessary security credentials needed to bootstrap and authenticate with that M2M server. There are a number of methods by which an M2M SCU or M2M gateway may establish a relationship with an M2M service provider and, in turn, obtain the security credentials to allow it to bootstrap and register with an M2M server. Non-automated offline provisioning relies on establishing M2M service provider relationships, (e.g., subscriptions), between M2M SCUs, gateways and servers, and distributing the necessary security credentials in an offline provisioning manner. Although this offline provisioning approach is viable, there are limitations and drawbacks associated with it. For example, offline provisioning may be costly since it often requires human intervention during initial deployment as well as for re-configuration or re-deployment.

M2M service discovery may be similar to the discovery of M2M service capability layers (SCLs) located on M2M SCUs, gateways and servers. Before an SCL may be accessed by either an application or another SCL, it is important to have a uniform resource identifier (URI) for proper addressing. In addition, knowledge of attributes, such as the types of M2M services supported by the SCL, may also be valuable, since this information may be used by applications and SCLs to determine which SCL(s) they desire to register with.

In one embodiment, an M2M service provider discovery procedure assumes that the network address of an M2M service discovery function (MSDF) is either offline provisioned or otherwise discovered. For example, if the MSDF is realized within a DNS-SD server, then the MSDF network address may be equivalent to the DNS-SD address, which is typically configured and made available by a network service provider.

Figure 2:
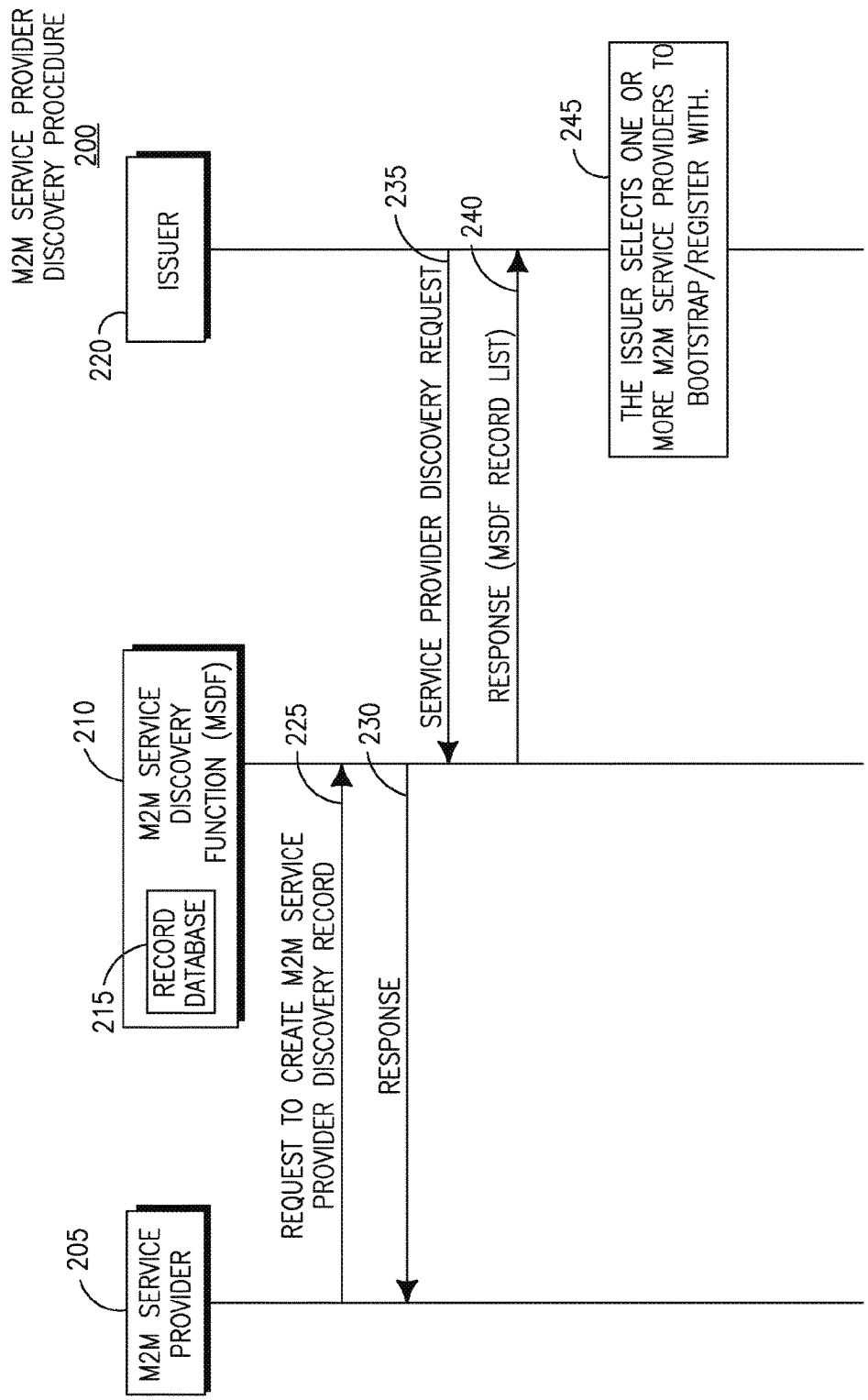
FIG. 2 shows an machine-to-machine (M2M) service provider discovery procedure.

FIG. 2 shows an M2M service provider discovery procedure 200 performed in a network including an M2M service provider 205, an MSDF 210 having a record database 215, and an issuer 220. As shown in FIG. 2, the M2M service provider 205 may send a request 225 to the MSDF 210 to create an M2M service provider discovery record, which may be stored in the record database 215. The request 225 may include various types of information used to create the discovery record, such as an MSDF record type, (e.g., M2M service provider discovery), an absolute URI to the M2M service provider's bootstrap function, the type of information the M2M service provider requires for subscription, (e.g., type of identification or address), classes of M2M services supported by the M2M service provider, (e.g., mobility, scheduling delay, supported data rates, persistence, priority levels, and the like), type of protocol(s) used to communicate with the M2M service provider, (e.g., hypertext transfer protocol (HTTP)/transmission control protocol (TCP), constrained application protocol (CoAP)/user datagram protocol (UDP), and the like), types of M2M service identifiers supported by the M2M service provider, (e.g., building automation, e-health, consumer electronics, utilities, and the like), types of M2M applications or SCUs supported by the M2M service provider, (e.g., thermostat, heart monitor, camera, and the like), and secondary M2M service providers (e.g., a specific utility company, a specific security company, and the like).

As shown in the M2M service provider discovery procedure 200 of FIG. 2, the MSDF 210 may send a response 230 to the M2M service provider 205 indicating whether the M2M service provider discovery record (i.e., MSDF record) was successfully created or not. The issuer 220 may discover available M2M service providers by sending a service provider discovery request 235 to the MSDF 210. The service provider discovery request 235 may include various types of information used by the MSDF 210 to query its record database 215 and determine matching M2M service provider discovery records, such as an MSDF record type, (e.g., M2M service provider discovery), and optional query string or strings that the MSDF 210 may use to search its record database 215 and filter its response. For example, query strings may specify a specific M2M service provider, types or classes of M2M services the issuer 220 is looking for, or types of protocols that the issuer 220 supports.

In response to the service provider discovery request 235, the MSDF 210 may send a service provider discovery response 240 including an MSDF record list that matches the queries in the discovery request 235. The issuer 220 may then select, from the MSDF record list in the response 240, one or more M2M service providers to bootstrap/register with (245).

Figure 3:
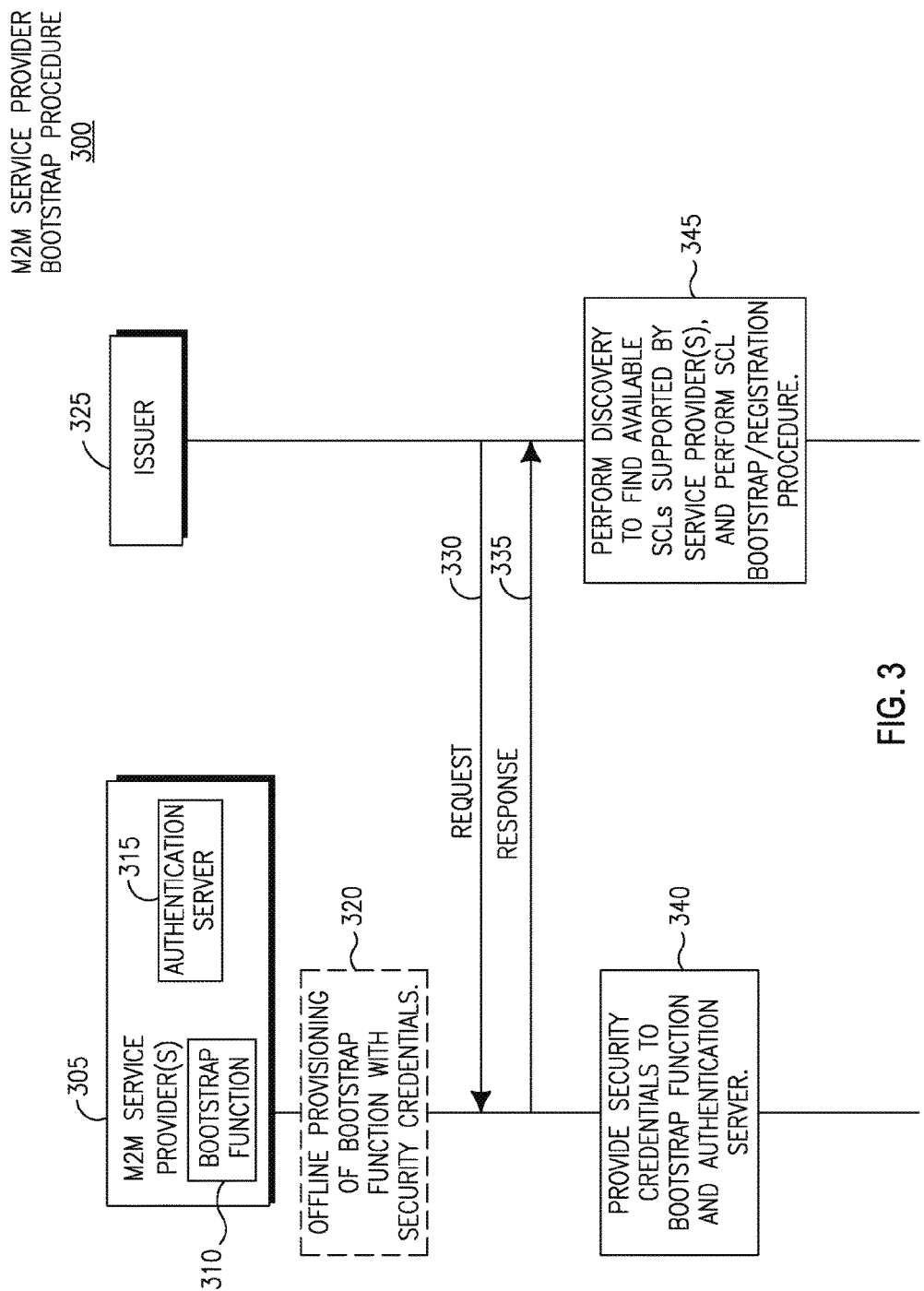
FIG. 3 shows an M2M service provider bootstrap procedure.

FIG. 3 shows an M2M service provider bootstrap procedure 300 in which M2M SCUs, gateways and applications bootstrap to M2M service providers. It is assumed that an SCU/gateway/application has either been offline provisioned with the address of the M2M service provider's bootstrap function, or has discovered it during the M2M service provider discovery procedure 200 of FIG. 2.

Common instances where M2M service provider bootstrapping is suitable is where an M2M SCU/gateway/application does not have a subscription with an M2M service provider and uses M2M service provider discovery to determine one or more available service providers. Furthermore, an M2M SCU/gateway/application may change from an existing M2M service provider subscription to another M2M service provider subscription, or subscribe to another M2M service provider for additional services. For example, the existing M2M service provider may not offer the services the SCU/gateway seeks.

The M2M service provider's bootstrap function may facilitate the bootstrapping of M2M SCUs, gateways and applications with M2M service providers. An important function of the bootstrap function is the distribution of M2M security credentials to M2M SCUs/gateways/applications, as well as to the M2M service provider's management functions, (e.g., an M2M authentication server (MAS) and an M2M service bootstrap function (MSBF)). These security credentials are then used during subsequent M2M service bootstrap procedures according to M2M functional architecture. Depending on the M2M service provider, offline provisioning of its bootstrap function may be necessary, (e.g., with a globally unique and permanent identifier such as a medium access control (MAC) address of each SCU approved to bootstrap with it).

As shown in the M2M service provider bootstrap procedure 300, an M2M service provider 305 may require offline provisioning of its bootstrap function 310 with security credentials of an authentication server 315 (320). An issuer 325 may then begin bootstrapping to the M2M service provider(s) of its choice by sending a request 330 to the bootstrap function 310 of the selected M2M service provider(s) 305. The request 330 may include subscription information necessary to the bootstrap function 310, such as a globally unique identifier. The bootstrap function 310 may send a response 335 to the issuer 325 with the necessary security credentials needed by the issuer 325 to initiate bootstrapping with any of the SCLs of the service provider(s) 305. The bootstrap function 310 may grant access to only a subset of the SCLs of the M2M service provider(s) 305, and this information may also be included in the response 335.

It may be necessary for the transfer of security credentials from the bootstrap function 310 to the issuer 325 to take place through a secure transfer environment, such as a secure Web interface. The bootstrap function 310 may also provide the necessary security credentials to the authentication server 315 and an MSBF (not shown) of the service provider(s) 305, (e.g., through a secure transfer environment, such as a secure Web interface), (340). The issuer 325 may perform SCL discovery to determine the available SCLs supported by the M2M service provider(s), and perform an SCL bootstrap/registration procedure (345).

In another embodiment, an M2M SCU/gateway may establish a relationship with an M2M service provider, and may use SCL discovery to determine the available SCLs offered by that service provider. In another embodiment, an M2M SCU/gateway may not have a relationship with an M2M service provider and may use SCL discovery to determine the type of SCL(s) it requires and, in turn, the M2M service provider(s) may offer those SCL(s). In yet another embodiment, an M2M SCU/gateway may switch, (e.g., it is redeployed), to a new M2M service provider and may need to discover the SCLs supported by the new service provider. In yet another embodiment, an M2M SCU/gateway may require different or additional services than those currently provided by the existing SCL(s) with which it is registered, (e.g., it is reconfigured). In yet another embodiment, an application, (e.g., an M2M service capable device application (DA), gateway application (GA), network application (NA), or non-M2M service capable device application (D'A)) may need to discover its local SCL(s). In yet another embodiment, an M2M server may need to discover services supported by other M2M servers, gateways and devices.

MSDF SCL discovery may be used to determine SCLs when the network address of the host of the SCL is not known. For example, an M2M SCU/gateway may need a particular type of SCL, but may not know the network address of the M2M server hosting that type of SCL. The M2M SCU/gateway may enlist the help of the MSDF to discover the network address of the M2M server offering that type of SCL.

Figure 4:
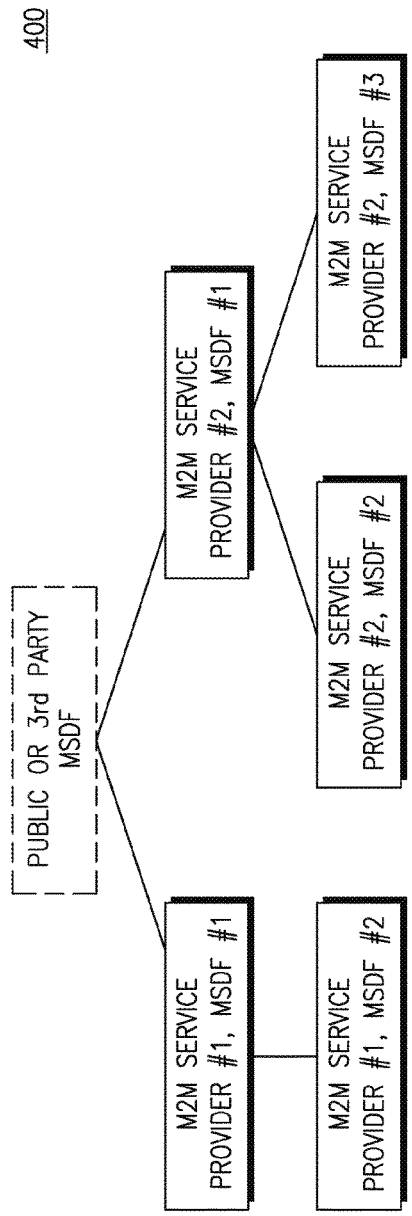
FIG. 4 shows an example of M2M service discovery function (MSDF) hierarchy architecture.

FIG. 4 shows an example of MSDF hierarchy architecture 400. The MSDF may facilitate automated discovery of M2M service providers (#1 and #2) and M2M SCLs. An MSDF may be a hierarchically distributed database that may be accessed by M2M SCUs, gateways, applications and M2M servers. As shown in FIG. 4, the MSDF hierarchy architecture 400 may not have only one centrally located MSDF, but rather a plurality of MSDFs (#1, #2 and #3). The distributed and decentralized architecture of the MSDF hierarchy architecture 400 may allow it to scale and support large numbers of M2M service providers and SCLs implemented on M2M servers, gateways and SCUs. Likewise, ownership of the MSDF hierarchy architecture 400 may also be distributed and segmented into domains to allow the management and access controls to M2M service providers, and for SCLs to be controlled by each domain owner, (e.g., an M2M service provider).

Figure 5:
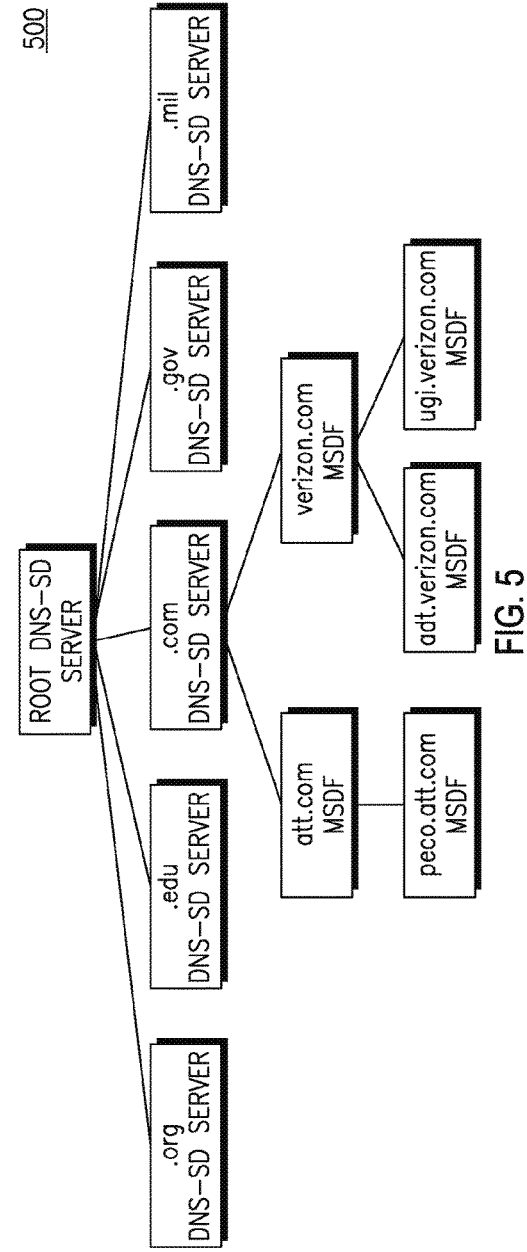
FIG. 5 shows an example of an integrated MSDF/domain name system (DNS) server hierarchy architecture.

The distributed and hierarchical nature of the MSDF hierarchy architecture 400 shown in FIG. 4 may also allow it to be merged and inter-networked together with existing naming and service discovery systems, such as domain name system (DNS) and DNS-service discovery (DNS-SD). FIG. 5 shows an example of an integrated MSDF/DNS server hierarchy architecture 500 to allow the M2M service providers to register and advertise their services with the DNS infrastructure and make their M2M services discoverable to others outside their respective local M2M service provider domains.

An MSDF database may store a plurality of MSDF records and the MSDF may support multiple record types. For example, record types such as M2M service provider or M2M SCL records may be created. Supporting different record types allows the MSDF to have different M2M service discovery record formats if needed. For each record format an MSDF supports, record attributes may be defined to contain information, such as SCL host address, SCL service class, and the like.

An MSDF may support creating, updating, deleting or retrieving MSDF records. In addition, the MSDF may also support queries to find MSDF records based on MSDF record attributes. For example, an MSDF may be queried for all MSDF records of type M2M SCL having a certain record attribute in the respective domain, e.g., named 'mobility' equal to 'no'. In response, the MSDF may return a list of MSDF records of type M2M SCL with the 'mobility' attribute equal to 'no', (if any are retrieved).

The MSDF SCL discovery procedure may rely on the awareness of the network address of the MSDF, which may be offline provisioned or otherwise discovered. Typically, this may be the address of the nearest MSDF, (e.g., the MSDF in the local domain). For example, if the MSDF is realized within a DNS-SD server, then the MSDF network address may be equivalent to the local DNS-SD server address, which may be configured and made available by the underlying network service provider or domain administrator.

Figure 6:
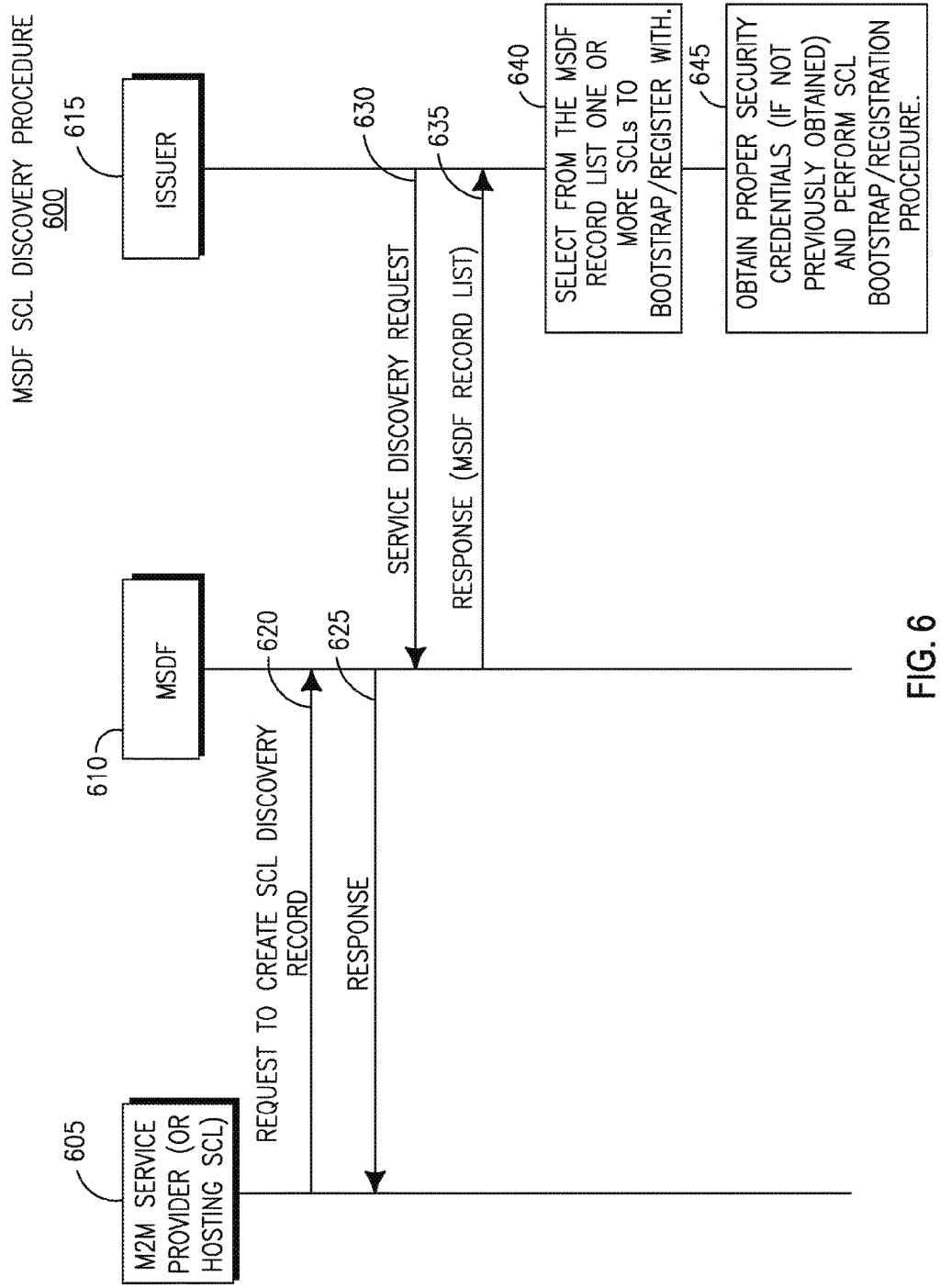
FIG. 6 shows an MSDF service capability layers (SCLs) discovery procedure.

FIG. 6 shows an MSDF SCL discovery procedure 600 in a network including an M2M service provider (or hosting SCL) 605, an MSDF 610 and an issuer 615. The M2M service provider (or hosting SCL) 605 may issue a request 620 to the MSDF 610 to create an SCL discovery record in order to make the SCL discoverable to others via MSDF lookups. An SCL discovery record may be configured with various types of attributes, such as an MSDF record type, (e.g., M2M SCL discovery), M2M service provider that owns the SCL, an absolute URI to the sclBase of the SCL, addresses and attributes of other network entities, (e.g., addresses and supported protocols of device management servers, bootstrap servers, and the like), types of M2M service capabilities supported by the SCL, classes of M2M services supported by the SCL, (e.g., mobility, scheduling delay, supported data rates, persistence, priority levels, and the like), type of protocol(s) used to communicate with the SCL, e.g., HTTP/TCP, CoAP/UDP, and the like), types of M2M service identifiers supported by the SCL, (e.g., building automation, e-health, consumer electronics, utilities, and the like), and types of M2M applications or devices supported by the SCL, (e.g., thermostat, heart monitor, camera, and the like).

In response to the SCL discovery record creation request 620, the MSDF 610 may send a response 625 to the M2M service provider (or hosting SCL) 605 indicating whether the SCL discovery record was successfully created or not. The issuer 615 may discover SCLs by sending a service discovery request 630 to the MSDF 610. Alternatively, available services may be advertised by the MSDF 610. The service discovery request 630 may include an MSDF record type, (e.g., M2M SCL discovery), an optional query string that the MSDF 610 uses to search its database, and a filter response which it provides. For example, query strings may specify a specific M2M service provider, types or classes of M2M services the issuer 615 is looking for, or types of protocols that the issuer 615 supports.

In response to the service discovery request 630, the MSDF 610 may send a service discovery response 635 to the issuer 615 including an MSDF record list that matches the queries in the service discovery request 630. In the event that queries result in multiple matching records, the MSDF 610 may include, in the service discovery response 635, additional capabilities to determine which records are returned in its responses. For example, the MSDF 610 may load balance requests across SCLs of the same type by keeping track of how many records of each type are returned in responses. The issuer 615 may select one or more SCLs to bootstrap/register with from the MSDF record list it received in the service discovery response 635 (640). The issuer 615 may perform an SCL bootstrap/registration procedure if it previously obtained the proper security credentials (645). Otherwise, it may be necessary for the issuer 615 to first obtain the proper credentials, (e.g., through offline provisioning or completing the M2M service provider discovery procedure 200 of FIG. 2, and the M2M service provider bootstrap procedure 300 of FIG. 3).

The MSDF SCL discovery procedure 600 may be bound to a DNS-SD protocol. This binding begins by defining and registering an MSDF DNS-SD service type with dns-sd.org (http://www.dns-sd.org/ServiceTypes.html). For example, a service named "m2 m" may be defined and registered appropriately. Additional MSDF DNS-SD service sub-types may be defined. FIG. 7 shows examples of types of service sub-types that may be supported via MSDF DNS-SD SCL discovery.

A DNS-SD pointer (PTR) record may be created on a targeted DNS server for each SCL service type instance, and optionally for each SCL service sub-type instance. A DNS-SD may use DNS PTR lookups to discover the list of available instances of a given service type. The response to a DNS PTR lookup is a list of matching instance names.

A DNS-SD PTR record for an SCL service type instance may have the format: service.proto.domain PTR instance.service.proto.domain. A DNS-SD PTR record for an SCL service sub-type instance has the format: sub-service.service.proto.domain PTR instance.sub-service.service.proto.domain. The sub-service in the DNS-SD pointer record may be an underscore character followed by the sub-service name (e.g., _hdr). The service in the DNS-SD pointer record may be an underscore character followed by the application protocol name (e.g., _m2m). The proto in the DNS-SD pointer record may be an underscore and either "_tcp" (for application protocols that run over TCP) or "_udp" (for all others). The domain in the DNS-SD pointer record may specify the DNS sub-domain within which the service names are registered. It may be "local.", meaning "link-local domain", or it may be a non-local DNS domain name (e.g. "com"). The PTR in the DNS-SD pointer record may be a DNS keyword used in DNS PTR records. The instance in the DNS-SD pointer record may b: a user-friendly name assigned to the service instance, (e.g., a name of an M2M service provider, such as a utility provider named "peco").

An example PTR record for an SCL service instance of type "m2 m" and instance name "peco" may be: _m2m._tcp.example.com. PTR peco._m2m._tcp.com.

An example PTR record for an SCL service instance of sub-type "utility" and type "m2 m" having an instance name of "peco" may be: utility._m2m._tcp.example.com. PTR peco._m2m._tcp.com.

A DNS-SD service (SRV) record may be created on a targeted DNS server for each SCL service type instance and optionally for each service sub-type instance. The DNS-SD may use DNS SRV records to define the target host name or address and port where a service instance may be reached.

An SRV record for an SCL service type instance may have the format: _service._proto.domain time-to-live (TTL) class SRV priority weight port target.

An SRV record for an SCL service sub-type instance may have the format: sub_service._service._proto.domain TTL class SRV priority weight port target. In this SRV record, sub_service may be the symbolic name of the desired sub-service, service may be the symbolic name of the desired service, proto may be the transport protocol of the desired service, which is usually either TCP or UDP, domain may be the domain name for which this record is valid, TTL may be the standard DNS time to live field, class may be a standard DNS class field (this is always Internet (IN)), priority may be the priority of the target host, where the lower value means more preferred, weight may be a relative weight for records with the same priority, port may be the TCP or UDP port on which the service is to be found, and target may be the canonical hostname of the machine providing the service.

An example SRV record for an SCL service instance of type "m2 m" and instance name "peco" may be: _m2m._tcp.example.com. 86400 IN SRV 0 5 5060 peco.m2m.example.com.

An example SRV record for an SCL service instance of sub-type "utility" and type "m2 m" having an instance name "peco" may be: _utility._m2m._tcp.example.com. 86400 IN SRV 0 5 5060 peco.m2m.example.com.

An MSDF DNS-SD text (TXT) record may be created on a targeted DNS server for each SCL service and sub-service instance. The DNS-SD may use DNS TXT records to store arbitrary name/value pairs conveying additional information about the named service. Each name/value pair may be encoded as its own constituent string within the DNS TXT record, in the form "name=value". Everything up to the first '=' character is the name. Everything after the first '=' character to the end of the string (including subsequent '=' characters, if any) is the value. From an SCL discovery standpoint, the DNS-SD TXT record may be used to store useful SCL attribute information such as the URI path to an SCL, the different types of features, protocols, etc. supported by an SCL.

For example, a DNS-SD TXT record may be used to provide the path portion of an SCL URI, (i.e., not the IP address or port which is provided by the SRV record): scl=<uri_path_to_sclBase>.

A DNS-SD TXT record may also be used to define the service sub-types supported by an SCL, (such as those shown in FIG. 7), rather than using DNS PTR and SRV records. For example, a DNS-SD TXT record could include SCL service sub-type name/value pairs, such as utility=true, sclhttp=true and rates=true.

Figure 8:
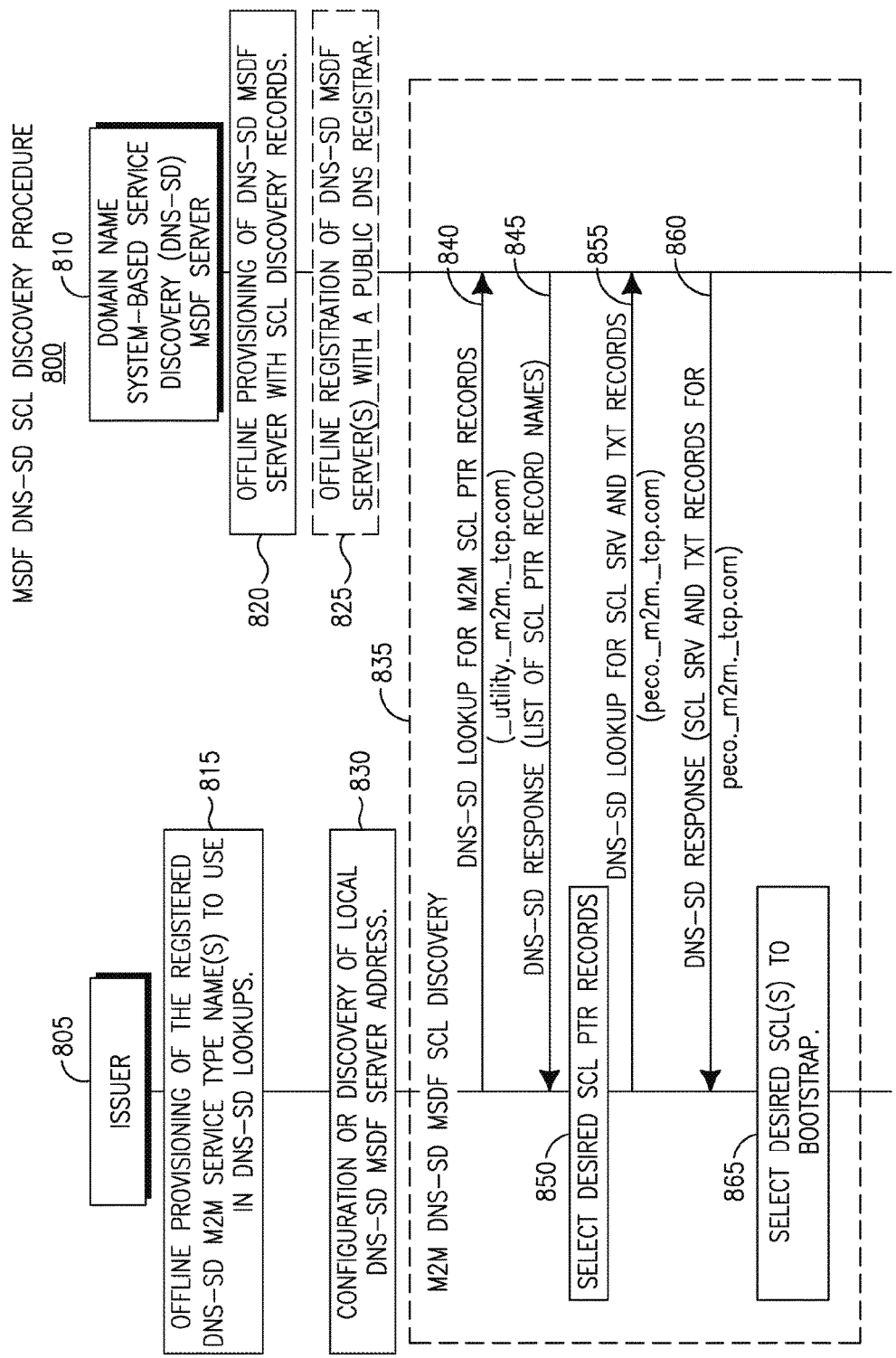
FIG. 8 shows an MSDF DNS-SD SCL discovery procedure.

FIG. 8 shows an MSDF DNS-SD SCL discovery procedure 800 to find a service instance of type "m2m" and sub-type "utility" in a network including an issuer 805 and a local DNS-SD MSDF server 810. Referring to FIG. 8, the issuer 805 may perform offline provisioning of the registered DNS-SD M2M service type name(s) to use in DNS-SD lookups (815). The local DNS-SD MSDF server 810 may be provisioned offline with SCL discovery records (820).

Each M2M service provider may create SCL discovery records, (e.g., DNS-SD PTR, SRV and TXT records), in the local DNS-SD MSDF server 810, which it either owns and administers itself, or sub-contracts to another party to manage. These SCL discovery records may include attributes such as an absolute address (i.e., URI) of the individual SCLs (i.e., sclBases), the types/classes of services supported by the SCLs, and the like. Each M2M SCU, gateway, or server may be provisioned with the registered or standardized DNS-SD M2M service type name(s) which it uses for DNS-SD PTR record lookups.

The local DNS-SD MSDF server 810 may be registered offline with a public DNS registrar company or entity to establish a public DNS-SD MSDF service discovery domain (825). The public DNS registrar company or entity may make this information publicly available. Other DNS-SD MSDF servers may discover any new service discovery sub-domains that have been established under their level of hierarchy. This may result in an M2M service provider's DNS-SD MSDF server being discovered and interconnected into the hierarchy of existing DNS-SD MSDF servers. If a private DNS-SD MSDF deployment is preferred, step 825 may be skipped.

The DNS-SD MSDF client of the issuer 805 may discover, be configured or be provisioned with the address of its assigned local DNS-SD MSDF server (830). Depending on the underlying access network technology, this process may be automated or it may require manual offline configuration. The issuer 805 may initiate an M2M SCL discovery procedure 835 by sending a DNS-SD PTR query 840 for '_utility._m2m._tcp.com' to its local DNS-SD MSDF server 810. The assigned local DNS-SD MSDF server 810 may respond to the issuer 805 with a DNS-SD response 845 including a list of available DNS-SD PTR records, each containing a M2M SCL instance name of a corresponding SCL. The issuer 805 may select one or more PTR records that it would like to resolve in order to get the corresponding SCL network address and possible additional discovery information for, (e.g., peco._m2m._tcp.com), (850). The issuer 805 may send one or more DNS-SD query requests 855 to the local DNS-SD MSDF server 810 for each SCL instance name it would like to resolve. Note that separate requests may be needed for each SCL instance name.

The local DNS-SD MSDF server 810 may send a response 860 with the SRV and TXT records for each corresponding DNS-SD query request 855. The SRV record may contain the network name or address of the SCL, (e.g. a fully qualified domain name (FQDN) or IP address and port). The TXT record may contain optional information such as the URI path to sclBase, types or classes of services, protocols, and the like, supported by the SCL. Note that if an FQDN is returned in SRV record rather than an IP address, then an additional DNS lookup may be required to resolve the FQDN to an IP address. The issuer 805 may select SCL(s) to bootstrap to (e.g., using information from the TXT record to find most suitable SCL), (865).

The resource SCL Discovery procedure may be characterized as a lighter weight procedure compared to the MSDF-based procedure, since it does not require any interaction with an MSDF. This lightweight SCL discovery procedure may be particularly well-suited for resource constrained, (e.g., non-M2M service capable), SCUs residing behind an M2M gateway, but may potentially be used in other scenarios as well. The network address of the host that is to be targeted during the SCL discovery procedure may be known in advance.

Figure 9:
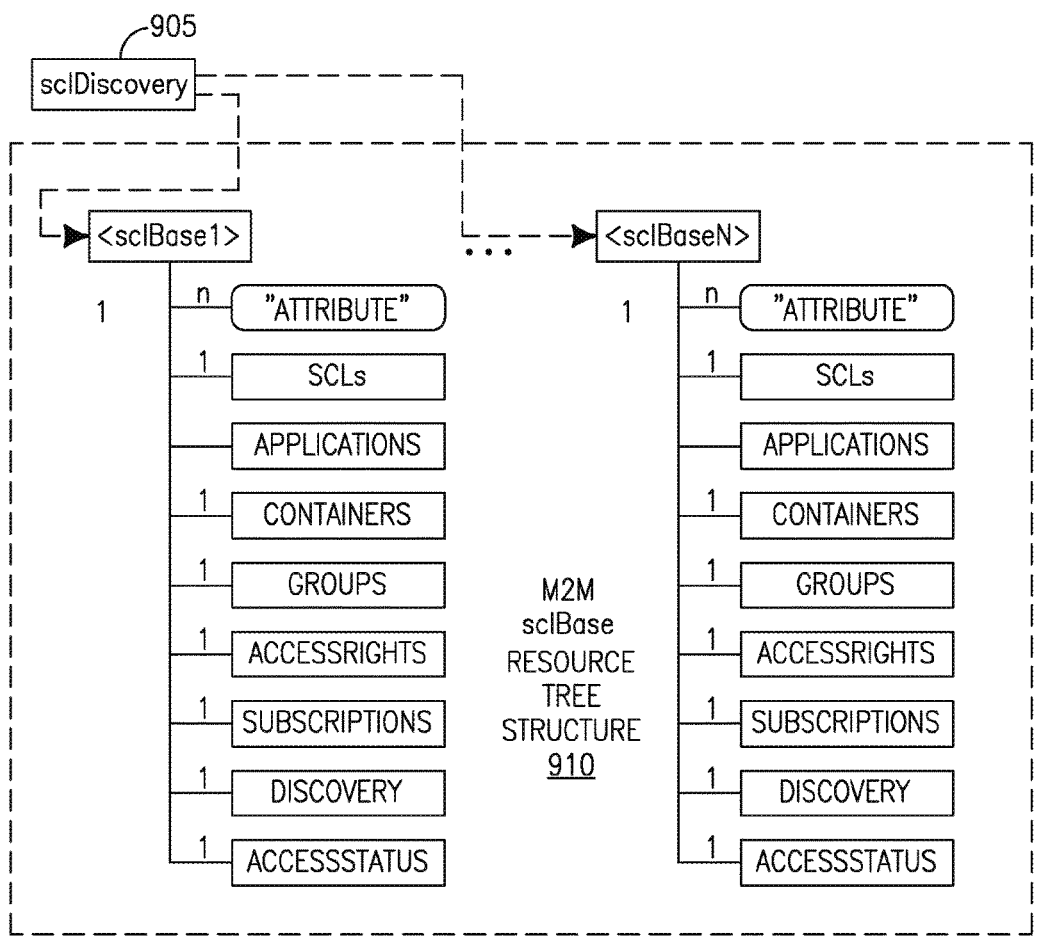
FIG. 9 shows an M2M service discovery resource structure including an sclDiscovery resource.

FIG. 9 shows an M2M service discovery resource structure 900 including an sclDiscovery resource 905, which is a known resource used to facilitate the automated discovery of SCLs. It may be used to retrieve a list of URIs for SCLs matching the SCL discovery query criteria included in an SCL discovery request. The sclDiscovery resource 905 may support discovery of SCLs on a hosting M2M server, gateway or device in a more lightweight and automated manner, as compared to the MSDF approach described herein. This lightweight SCL discovery procedure may be particularly well-suited for resource constrained non-M2M service capable devices residing behind an M2M gateway, but may be used in other scenarios as well. The network address of the hosts that are to be targeted during the SCL discovery procedure may be known in advance.

For example, a non-M2M service capable device may know the IP address of its corresponding M2M gateway to be able to discover it. For non-M2M service capable devices residing behind an M2M gateway, knowledge of the M2M gateway's network address may be known since the M2M gateway is the coordinating network node for these types of networks and, as a result, the non-M2M service-capable device may discover the gateway's network address during lower layer network initialization and association procedures.

The sclDiscovery resource 905 in the M2M service discovery resource structure 900 of FIG. 9 may be a known resource implemented a level above an M2M sclBase resource tree structure 910. The sclDiscovery resource 905 may maintain the absolute URI for each sclBase resource hosted by the M2M server, gateway or device. The rationale behind the known sclDiscovery resource 905 is that discovering an SCL in a "RESTful" manner, (where RESTful refers to conforming to representational state transfer (REST) contraints), may equate to the discovery of an SCL's<sclBase> resource. By maintaining a known sclDiscovery resource 905 on an M2M server, gateway or device, the discovery of hosted SCLs may be performed in a restful and automated fashion that is well suited for M2M use-cases that often times are required be automated and may not rely on any human interaction.

The sclDiscovery resource may support create retrieve update and destroy (CRUD) requests as well as filter criteria, such as, those that involve sclBase attributes. It is important to note that multiple SCLs may be implemented locally on the same M2M server, gateway or device. Thus, the sclDiscovery response may contain a list of absolute sclBase URIs that match the filter criteria specified in an SCL discovery retrieve request.

An example of an SCL discovery request including filter criteria may be: "Retrieve coap://m2m.myoperator.org:<well_known_m2m_port>/discovery?attrib1=val1&attrib2=val2 . . . ."

The use of a known port may further enable the automation of SCL discovery. By defining a known port along with the known sclDiscovery resource, the only remaining information required to perform SCL discovery may be the network address, (e.g., IP address), of the targeted M2M server, gateway or device.

Figure 10:
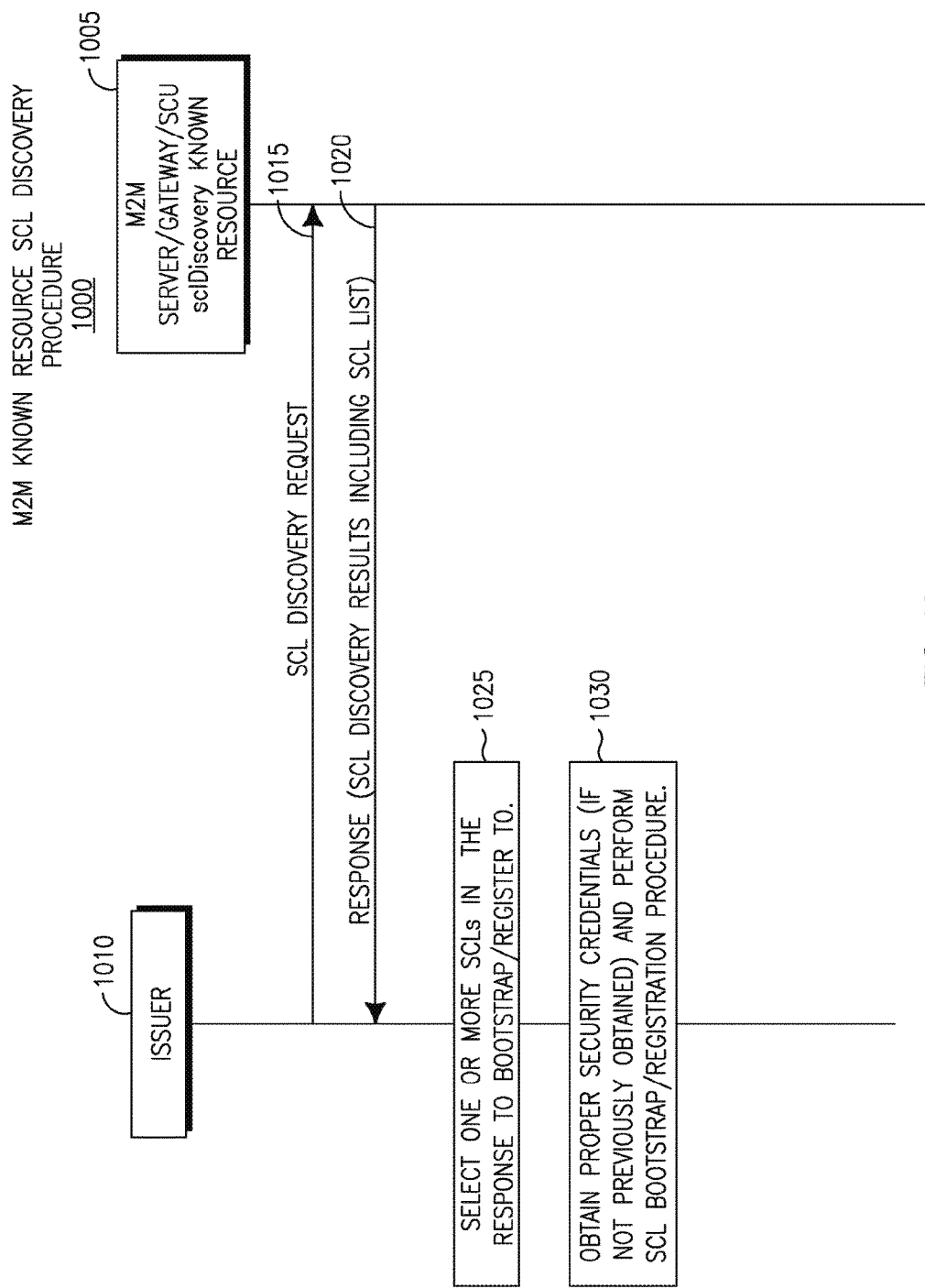
FIG. 10 shows an M2M known resource SCL discovery procedure.

FIG. 10 shows an M2M known resource SCL discovery procedure 1000. Each M2M server, gateway and device maintains its own sclDiscovery known resource 1005. Their responsibilities may include maintaining an absolute URI for each hosted sclBase resource and servicing of CRUD requests to an sclDiscovery known resource, along with query strings. An issuer 1010 may send an SCL discovery request 1015 to the targeted M2M server, gateway or device sclDiscovery known resource 1005. A service discovery request comprises query strings that make use of sclBase attributes, such as accessRightID, searchStrings, creationTime, lastModifiedTime, Pocs, and schedule, and proposals for new sclBase attributes to support SCL discovery, such as an M2M service provider that owns the SCL, an absolute URI to the sclBase of the SCL, classes of M2M services supported by the SCL, (e.g., mobility, scheduling delay, supported data rates, persistence, priority levels, and the like), type of protocol or protocols used to communicate with the SCL, (e.g., HTTP/TCP, CoAP/UDP, and the like), types of M2M service identifiers supported by the SCL, (e.g., building automation, e-health, consumer electronics, utilities, and the like), types of M2M applications or devices supported by the SCL, (e.g., thermostat, heart monitor, camera, and the like), and secondary M2M service providers, (e.g., a specific utility company, a specific security company, and the like).

As shown in FIG. 10, the M2M server, gateway or device sclDiscovery known resource 1005 may send a service discovery response 1020 which provides the issuer 1010 with SCL discovery results. The response 1020 may include a list of SCLs that match the query strings in the SCL discovery request 1015. Further, the response 1020 may also include an absolute URI to the sclBase for each of the SCLs. The issuer 1010 may then select one or more SCLs from the SCL list in the response 1020 to bootstrap or register to (1025). The issuer 1010 may perform an SCL bootstrap/registration procedure if it previously obtained the proper security credentials (1030). Otherwise, it may be necessary for the issuer 1010 to first obtain the proper credentials, (e.g., through offline provisioning or completing the M2M service provider discovery procedure 200 of FIG. 2, and the M2M service provider bootstrap procedure 300 of FIG. 3).

DNS SCL discovery may be used to find M2M SCLs when the domain name of the host of the SCL is known, but not the network address. In such cases, the M2M application/SCU/gateway/server may enlist the help of a DNS server to discover the network address of the host having the corresponding domain name. Once the network address of the host is known, a mechanism such as the known resource SCL discovery procedure 1000 of FIG. 10 may be used to find the absolute URI of an SCL residing on the host.

Figure 11:
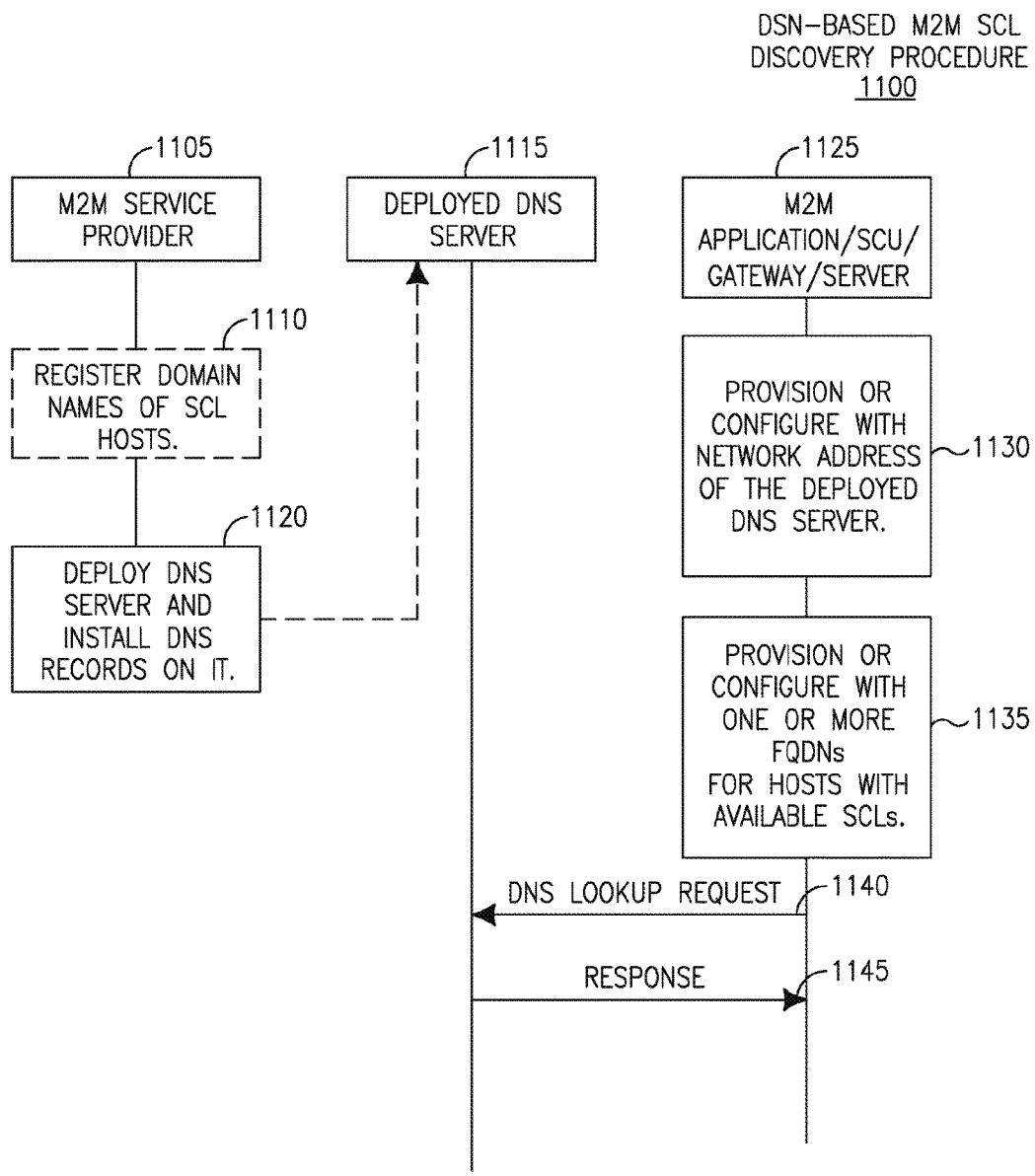
FIG. 11 shows a DNS-based M2M SCL discovery procedure.

FIG. 11 shows a DNS-based M2M SCL discovery procedure 1100. The DNS-based M2M SCL discovery procedure 1100 may rely on awareness of the network address of the DNS Server, which may either be offline provisioned and/or discovered in advance via a procedure such as access network bootstrapping, DHCP, device management configuration or some other comparable method.

An M2M service provider 1105 may register the domain names of each of its SCL hosts, (e.g., M2M server hosting an SCL), to make them public. If a private DNS deployment is desired, step 1110 may be skipped. The M2M service provider 1105 may deploy a DNS server 1115 and install DNS records on it for each of one or more of its M2M servers hosting SCLs (1120).

An M2M application/SCU/gateway/server 1125 may be provisioned with a network address of the deployed DNS server 1115, or may be dynamically configured with the network address of the DNS server 1115, (e.g., via a procedure such as access network bootstrapping, DHCP, device management configuration or some other comparable method), (1130). The M2M application/SCU/gateway/server 1125 may then be provisioned with one or more fully qualified domain names (FQDN) for hosts with available SCLs, or may be dynamically configured with this information via a procedure such as access network bootstrapping, DHCP, device management configuration or some other comparable method (1135).

The M2M application/SCU/gateway/server 1125 may discover SCLs by sending a DNS lookup request 1140 to the deployed DNS server 1115 using its provisioned/configured FQDN and the network address of the deployed DNS server 1115. The deployed DNS server 1115 may send a response 1145 with the resolved network address for the corresponding SCL host.

Depending on the format of the resolved network address, additional discovery steps may be required. If the resolved network address is an IP address of the host of the SCL, and not the full URI path to the SCL located on the host, then additional discovery may be needed, (e.g., the M2M known SCL resource discovery procedure 1000 of FIG. 10 may be used to discover the full URI using the IP address of the SCL host). If the M2M application/SCU/gateway/server 1125 already has the proper security credentials, it may perform an SCL bootstrap/registration procedure. Otherwise, the M2M application/SCU/gateway/server 1125 may first obtain the proper credentials, (e.g., through offline provisioning or by completing the M2M service provider discovery procedure 200 of FIG. 2 and the M2M service provider bootstrap procedure 300 of FIG. 3).

Figure 12:
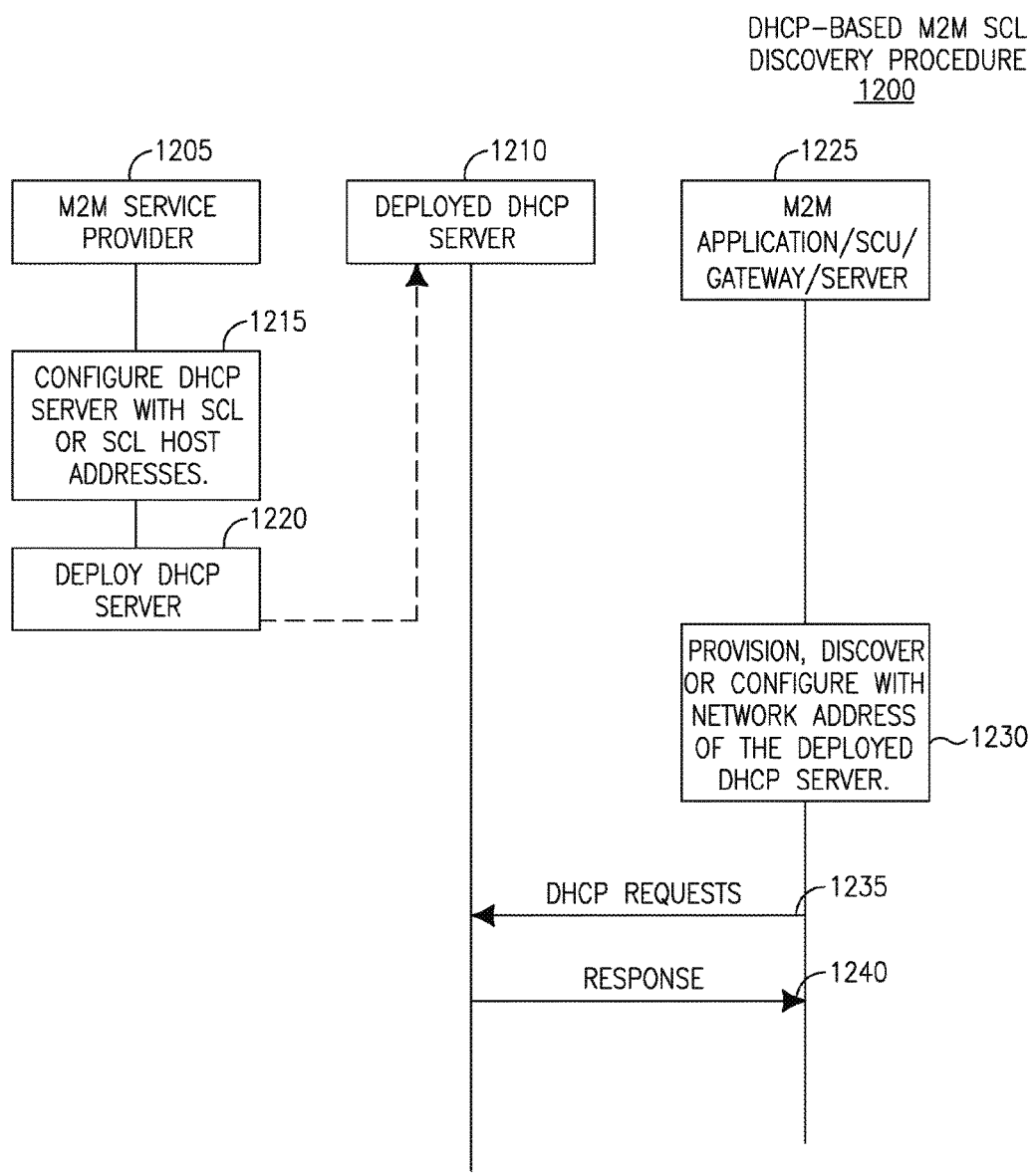
FIG. 12 shows a DHCP-based M2M SCL discovery procedure.

FIG. 12 shows a DHCP-based M2M SCL discovery procedure 1200. The DHCP-based M2M SCL discovery 1200 may be used to find M2M SCLs via requests to a DHCP server. In such cases, the M2M device/gateway may make requests to a DHCP server to discover the address of one or more available M2M SCLs that have been preprogrammed into the DHCP server, (e.g., by a DHCP server administrator). A DHCP server may also be used to provide additional SCL information other than the address of the SCL, (e.g., types of M2M service capabilities supported by the SCL, and the like).

The DHCP-based M2M SCL discovery procedure 1200 may rely on awareness of the network address of the DHCP server which may either be offline provisioned and/or discovered in advance via a procedure such as broadcasting, access network bootstrapping, device management configuration or some other comparable method.

An M2M service provider 1205 may configure a DHCP server 1210 with the addresses of each of its SCLs, (e.g., URI of SCL), or the address of each it SCL hosts, (e.g., IP address of an M2M server hosting an SCL), (1215). The M2M service provider 1205 may deploy the DHCP server 1210 to make it available for others to access (1220).

An M2M application/SCU/gateway/server 1225 may be provisioned with the network address of DHCP server 1210, or dynamically discover the network address of the DHCP server 1210, (e.g. via broadcasting), or be dynamically configured with the address of the DHCP server 1210 through a procedure such as access network bootstrapping, device management configuration or some other comparable method (1230). The M2M application/SCU/gateway/server 1225 may discover SCLs by sending DHCP requests 1235 to the DHCP server 1210. Note that different DHCP requests 1235 may be leveraged, (e.g., a DHCP inform type request may be used).

The DHCP server 1210 may send a response 1240 with the address of the SCL, (e.g., absolute URI of SCL or IP address of host of SCL), and additional SCL information other than the address of the SCL, (e.g., types of M2M service capabilities supported by the SCL).

Depending on the format of the SCL address returned, additional discovery steps may be required. If the returned SCL address is the IP address of the host of the SCL and not the full URI path to the SCL located on the host, then additional discovery may be needed, (e.g., the M2M known resource SCL discovery procedure 1000 of FIG. 10 may be used to discover the full URI using the IP address of the SCL host). If the M2M application/SCU/gateway/server 1225 already has the proper security credentials, it may perform an SCL bootstrap/registration procedure. Otherwise, the M2M application/SCU/gateway/server 1225 may first obtain the proper credentials, (e.g., through offline provisioning or by completing the M2M service provider discovery procedure 200 of FIG. 2 and the M2M service provider bootstrap procedure 300 of FIG. 3).

An underlying access network bootstrap/registration procedure may be used to assign an M2M SCL. In such cases, a M2M device/gateway/server may be configured with an assigned SCL during the access network bootstrap/registration procedure. Since M2M service registration may not be performed until after access network bootstrapping and registration are completed, this approach may be viable for cases where SCL configuration information is available at the time of access network bootstrap/registration.

An access network bootstrap/registration-based M2M SCL discovery procedure may rely on awareness of the SCL address by the access network provider in advance, (e.g., FQDN or IP address of a host of an SCL, URI of <sclBase>, and the like). An M2M service provider may share an SCL address with an access network provider, (e.g., they have an established relationship). The M2M device/gateway/server may perform an access network bootstrap/registration procedure, during which the access network provider may configure the device/gateway/server with the assigned SCL.

Depending on the format of the SCL address, additional discovery steps may be required. If the SCL address is in the form of an IP address or FQDN of the host of the SCL, and not the full URI path to the SCL located on the host, then additional discovery may be needed, (e.g., the M2M known resource SCL discovery procedure 1000 of FIG. 10 may be used to discover the full URI using the IP address of the SCL host). If the M2M device/gateway/server already has the proper security credentials, it may perform an SCL bootstrap/registration procedure. Otherwise, the M2M device/gateway/server may first obtain the proper credentials, (e.g., through offline provisioning or by completing the M2M service provider discovery procedure 200 of FIG. 2 and the M2M service provider bootstrap procedure 300 of FIG. 3).

An underlying access network management function, (e.g., Open Mobile Alliance-device management (OMA-DM)), may be used to assign an M2M SCL. In such cases, an M2M device/gateway/server may be configured with an assigned SCL via a network management function. The advantage of this approach is that the access network management function may not be limited to configuring an M2M device/gateway/server only during access network bootstrap/registration. Instead, the access network management function may issue multiple updates to configure/reconfigure an assigned SCL in a more dynamic fashion.

The device management-based M2M service discovery procedure may rely on awareness of the SCL address by the network management server in advance, (e.g., an FQDN or IP address of a host of an SCL, URI of <sclBase>, and the like).

The M2M service provider may share an SCL address with a network management server. The M2M device/gateway/server may perform an access network bootstrap/registration procedure. During this procedure, the device/gateway/server may be configured with the address of an assigned SCL by the network management server residing in the access network. Alternatively, the network management server may be provisioned with the address of the device/gateway/server or dynamically discover it, (e.g., by using some access network discovery mechanism such as broadcasts, localized broadcasts, and the like).

An M2M application/SCU/gateway/server may request SCL address information from the network management server. Alternatively, the network management server may send SCL address information to the device/gateway/server SCL. Depending on the format of the SCL address, additional discovery may be required. If the SCL address is in the form of an IP address or FQDN of the host of the SCL and not the full URI path to the SCL located on the host, then additional discovery may be needed, (e.g. the M2M known resource SCL discovery procedure 1000 of FIG. 10 may be used to discover the full URI using the IP address of the SCL host). If the device/gateway/server already has the proper security credentials, it may begin the SCL bootstrap/registration procedure. Otherwise, the device/gateway/server may first obtain the proper credentials, (e.g., through offline provisioning or by completing the M2M service provider discovery procedure 200 of FIG. 2 and the M2M service provider bootstrap procedure 300 of FIG. 3).

M2M service provider discovery may be needed when an M2M device/gateway/application does not have a subscription with an M2M service provider and uses M2M service provider discovery to find one or more available providers. Further, it may be needed when an M2M device/gateway/application may need to change an existing M2M service provider subscription to a new M2M service provider subscription, or possibly subscribe to another M2M service provider for additional services. For example, when an existing M2M service provider does not offer the services that a device/gateway requires, M2M devices, gateways and applications may perform a discovery procedure in order to find a suitable and available M2M service provider.

What is claimed is:

1. A method of accessing services affiliated with a service provider, the method comprising:
   an issuer performing a first discovery procedure to discover at least one service provider, wherein the first discovery procedure includes the issuer sending a service provider discovery request including a machine-to-machine (M2M) service class parameter, and the issuer receiving a service provider discovery response;
   the issuer performing a bootstrap procedure with the at least one discovered service provider; and
   the issuer performing a second discovery procedure to determine available service capability layers (SCLs) supported by the at least one discovered service provider, wherein the second discovery procedure comprises:
   transmitting a domain name system-based service discovery (DNS-SD) query from the issuer to a DNS-SD M2M service discovery function (MSDF) server, wherein the DNS-SD MSDF server is provisioned with SCL discovery records and wherein the DNS-SD MSDF server is registered with a public DNS registrar entity, and wherein the SCL discovery records include, for each SCL, a type of M2M service capabilities supported by each SCL and a class of M2M services supported by each SCL; and
   the issuer receiving SCL discovery records from the DNS-SD MSDF server in response to the DNS-SD query.

2. The method of claim 1 wherein the first discovery procedure comprises:
   transmitting a service provider discovery request including information for querying a record database to determine matching service provider discovery records; and
   receiving a service provider discovery response including a service discovery function record list that matches queries in the service provider discovery request.

3. The method of claim 2 further comprising:
   selecting at least one service provider from the service discovery function record list to bootstrap with.

4. The method of claim 3 wherein the bootstrap procedure comprises:

transmitting a request to the selected service provider; and
receiving a response from the selected service provider including information needed by a node to initiate bootstrapping with at least one SCL of the service provider.

5. The method of claim 4 wherein the information includes security credentials.

6. The method of claim 1 wherein the second discovery procedure comprises:
the issuer transmitting a service discovery request including information for querying a record database to determine matching SCL discovery records; and
the issuer receiving a service discovery response including a service discovery function record list that matches queries in the service discovery request.

7. The method of claim 6 wherein the service discovery function record list includes a plurality of SCL addresses, the method further comprising:
the issuer transmitting an SCL discovery request to a known resource to discover a uniform resource identifier (URI) of each of the SCL addresses that do not indicate a full URI path to an SCL located on a host;
the issuer receiving an SCL discovery response from the known resource including the discovered URIs; and
the issuer selecting at least one SCL from the service discovery function record list to bootstrap with.

8. The method of claim 1 wherein the second discovery procedure further comprises:
receiving an SCL discovery request from the issuer; and
transmitting a service discovery response which provides the issuer with SCL discovery results.

9. The method of claim 8 wherein the SCL discovery request includes query strings that use sclBase attributes.

10. The method of claim 9 wherein the SCL discovery response includes a list of SCLs that match the query strings and an absolute uniform resource identifier (URI) to an sclBase for each of the SCLs.

11. The method of claim 1 wherein the second discovery procedure further comprises:
provisioning or configuring the issuer with a network address of a deployed domain name system (DNS) server;
provisioning or configuring the issuer with at least one fully qualified domain name (FQDN) for hosts with available SCLs;
the issuer transmitting a DNS lookup request to the deployed DNS server using the network address and FQDN; and
the issuer receiving a resolved network address for a corresponding SCL host.

12. The method of claim 1 wherein the second discovery procedure further comprises:
provisioning or configuring the issuer with a network address of a dynamic host configuration protocol (DHCP) server;
the issuer transmitting DHCP requests to the DHCP server; and
the issuer receiving a response including the address of an SCL and additional SCL information.

13. The method of claim 1 wherein the issuer is a wireless transmit/receive unit (WTRU).

14. A non-transitory computer-readable storage medium configured to store an application with instructions executable by a processor, the instructions comprising:
instructions to perform a first discovery procedure to discover at least one service provider, wherein the instructions to perform the first discovery procedure includes instructions to send a service provider discovery request including a machine-to-machine (M2M) service class parameter, and instructions to receive a service provider discovery response;
instructions to perform a bootstrap procedure with the at least one discovered service provider; and
instructions to perform a second discovery procedure to determine available service capability layers (SCLs) supported by the at least one discovered service provider, wherein the second discovery procedure comprises:
instructions to transmit a domain name system-based service discovery (DNS-SD) query to a DNS-SD M2M service discovery function (MSDF) server, wherein the DNS-SD MSDF server is provisioned with SCL discovery records and wherein the DNS-SD MSDF server is registered with a public DNS registrar entity, and wherein the SCL discovery records include, for each SCL, a type of M2M service capabilities supported by each SCL and a class of M2M services supported by each SCL; and
instructions to receive SCL discovery records from the DNS-SD MSDF server in response to the DNS-SD query.

15. A wireless transmit/receive unit (WTRU) comprising:
at least one circuit configured to perform a first discovery procedure to discover at least one service provider, wherein the first discovery procedure includes the at least one circuit configured to send a service provider discovery request including a machine-to-machine (M2M) service class parameter, and the at least one circuit configured to receive a service provider discovery response;
the at least one circuit configured to perform a bootstrap procedure with the at least one discovered service provider; and
the at least one circuit configured to perform a second discovery procedure to determine available service capability layers (SCLs) supported by the at least one discovered service provider, wherein the second discovery procedure comprises:
the at least one circuit configured to transmit a domain name system-based service discovery (DNS-SD) query to a DNS-SD M2M service discovery function (MSDF) server, wherein the DNS-SD MSDF server is provisioned with SCL discovery records and wherein the DNS-SD MSDF server is registered with a public DNS registrar entity, and wherein the SCL discovery records include, for each SCL, a type of M2M service capabilities supported by each SCL and a class of M2M services supported by each SCL; and
the at least one circuit configured to receive SCL discovery records from the DNS-SD MSDF server in response to the DNS-SD query.

* * * * *